United States Patent [19]

Yumde et al.

[11] 3,919,716

[45] Nov. 11, 1975

[54] MAGNETIC RECORDING AND/OR REPRODUCING APPARATUS FOR BANDWIDTH REDUCED VIDEO SIGNAL AND DELAYED AUDIO SIGNAL

[75] Inventors: Yasufumi Yumde, Yokohama; Sho Narita, Fujisawa; Mikio Murai; Takashi Kubota, both of Katsuta, all of Japan

[73] Assignee: Hitachi, Ltd., Japan

[22] Filed: July 3, 1973

[21] Appl. No.: 376,134

[30] Foreign Application Priority Data

July 5, 1972 Japan .............................. 47-66682

[52] U.S. Cl. ........................ 360/9; 360/19; 360/35; 360/10; 178/DIG. 3; 178/5.6 R

[51] Int. Cl. ......................... H04m 5/78; H04n 7/00

[58] Field of Search ............ 178/5.6, 5.8 R, DIG. 3, 178/DIG. 35, 6.6 FS, 6.6 A; 360/19, 9, 10, 33, 22, 35

[56] References Cited

UNITED STATES PATENTS

| | | | |
|---|---|---|---|
| 3,085,130 | 4/1963 | Lemelson | 178/6.6 A |
| 3,493,677 | 2/1970 | Paine | 178/6.6 A |
| 3,564,127 | 2/1971 | Sziklai | 178/6.6 FS |
| 3,702,378 | 11/1972 | Bogenberger | 178/DIG. 3 |
| 3,715,481 | 2/1973 | Harr | 178/6.6 FS |
| 3,749,836 | 7/1973 | Hayami | 178/DIG. 3 |
| 3,752,912 | 8/1973 | Ohsawa | 178/DIG. 3 |

*Primary Examiner*—Bernard Konick
*Assistant Examiner*—Alan Faber
*Attorney, Agent, or Firm*—Craig & Antonelli

[57] ABSTRACT

A video signal recording device comprises magnetic tape recording means for the audio frequency band and first memory means capable of storing a video signal representing one picture, the video signal being written in the memory means at a high speed and read out at a low speed to thereby to convert the signal into a signal in the audio frequency band, so that a signal such as a television signal representing a frame or field is converted into a signal in the audio frequency band by the first memory means and recorded in the magnetic tape recording means together with an audio signal. The audio signal is delayed for a period of time equal to the processing time required for the bandwidth reduction of the video signal. A video signal reproducing device comprises a magnetic tape reproducing means for the audio frequency band and second memory means capable of storing a video signal representing one picture, the video signal being written in the second memory means at a low speed and read at a high speed to thereby to convert a signal in the audio frequency band into a signal of the video frequency band, so that the video signal of the audio frequency band reproduced from the magnetic tape reproducing means is converted into a signal in the video frequency band by the second memory means and repeatedly read out of it to thereby produce a video signal representing a still picture.

10 Claims, 8 Drawing Figures

MAGNETIC RECORDING AND/OR REPRODUCING APPARATUS FOR BANDWIDTH REDUCED VIDEO SIGNAL AND DELAYED AUDIO SIGNAL

This invention relates to a magnetic recording and/or reproducing apparatus for video and audio information or, more in particular, to such as an apparatus in which still picture signals and audio signals recorded in a simple audio magnetic tape or other recording medium are reproduced, so that a still picture is displayed on a video monitor such as a television receiver, while at the same time reproducing corresponding sound through an audio monitor.

The typical video recording and reproducing apparatuses which have so far been used for the recording and reproduction of video and audio information include video tape recording means and electronic video recording systems. Such video recording and reproducing apparatuses require a considerable amount of recording media due to the necessity to handle dense information per unit time for the recording of moving picture information such as represented by television signals. Another disadvantage of the prior art video recording and reproducing apparatus lies in that the apparatus itself necessarily becomes complicated, bulky and expensive if faithful reproduction of video information is to be effected.

One conventional apparatus employed when moving picture information is absolutely necessary comprises a combination of an audio recording-reproducing device and a film projector for reproduction of selected still pictures to thereby obtain both video and audio information at low cost. In such an apparatus, however, video information and audio information are stored in different media, making the process of mounting the recording media in the apparatus very troublesome. Further, the fact that the video information in the form of electrical signals cannot be obtained makes the television receiver or the like display monitor unusable with it.

Accordingly, it is an object of the invention to provide an apparatus which is easily handled and capable of recording and/or reproducing both selected pieces of still picture information as well as audio information.

Another object of the invention is to provide an apparatus in which both video and audio information are recorded in the same recording medium.

A further object of the invention is to provide a recording and/or reproducing apparatus in which video signals and audio signals are recorded in a small amount of recording media and the video information in the form of electrical signals is obtained.

Still another object of the invention is to provide a recording and/or reproducing apparatus in which video information can be recorded and reproduced by the use of recording-reproducing means and recording medium for the audio frequency band.

In order to achieve the above-mentioned objects, the present invention is characterized in that in recording video signals, memories called speed conversion memories are used which are capable of changing the recording or reproducing speed and which have the storage capacity of a video signal representing one picture, that is, a frame or field of signals in terms of, television signal, whereby a picture of video signals is taken out of picture signals for television broadcasting or video signals generated in an image pickup tube the such a video signal is stored at an ordinary speed of transmission, that is to say, 1/30 second in the case of a frame of television picture signals. The stored video signal is read at such a low speed as to be reduced to the audio frequency band and then it is recorded in a track of the audio signal recording means at the same speed as the audio signal. Thus, a succession of video signals representing a desired picture is recorded, while audio signals associated with the video signal are recorded in another track of the audio signal recording means.

In the reproduction process, another similar speed conversion memory with the storage capacity of one picture is used which is capable of a repeated endless reading operation at the ordinary speed with which the stored video signal is read, whereby the stored video signal is reproduced at the same speed as when an audio signal is recorded, and then it is stored in the speed conversion memory. On completion of the storage of a picture, it is read at the ordinary speed of transmission and applied to a display monitor to produce a still picture.

In this way, a still picture and sounds associated therewith are reproduced simultaneously from the same recording medium. Further, the fact that the recording-reproducing means the audio frequency band is used simplifies greatly the handling of the apparatus and enables the amount of required recording media to be reduced.

The present invention will be apparent from the following detailed description taken in conjunction with the accompanying drawings, in which FIG. 1 is a diagram showing the fundamental construction of the tape recording means according to the invention;

The operating principle of the invention is explained below with reference to FIGS. 1, 2, 3 and 4.

Figure 1:
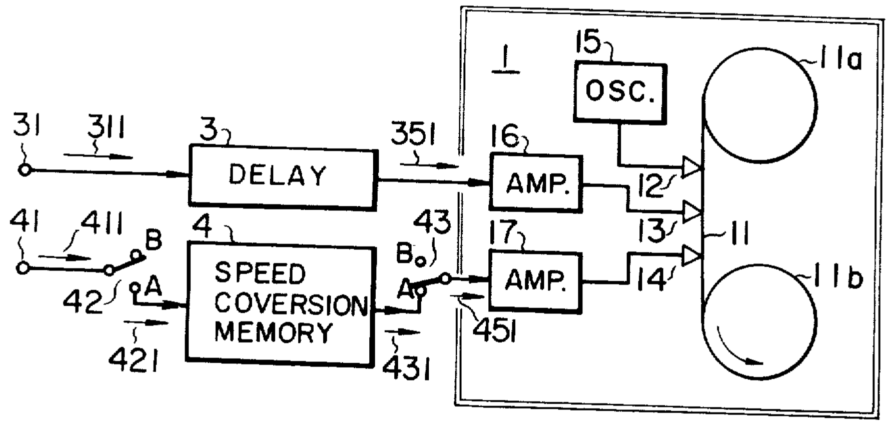

In FIG. 1, reference numeral 1 shows tape recording means similar to ordinary tape recording means for the audio frequency band which is capable of recording signals in two channels, reference numeral 11 a magnetic tape that is a recording medium, numerals 11*a* and 11*b* tape reels, numeral 12 an erasing magnetic head, and numerals 13 and 14 recording magnetic heads for recording signals on the first and second tracks of magnetic tape 11 respectively. Reference numeral 15 shows an erasing signal generator, numerals 16 and 17 recording amplifiers, numeral 4 a low-speed conversion memory with the storage capacity of one picture of video information in the form of electrical signals, that is to say, a frame or field of signals for television, in which a video signal corresponding to one picture is written during the same period as it is transmitted, or 1/30 second for a frame of television signal, while the same signal is reproduced at a lower speed and read out after being converted into a signal in the audio frequency band. In view of the fact that a recording medium is operated at a high or low speed for recording a video or audio signal respectively, a speed conversion memory for converting a signal from video frequency band to audio frequency band is referred to as a "low-speed conversion memory" while one for reverse conversion is as a "high-speed conversion memory" in this specification. Reference numeral 3 shows audio signal delay means with a delay time $\tau_s$ substantially equal to the time required for the low-speed conversion memory 4 to convert a video signal representing one picture into a corresponding signal in the audio frequency band. Numeral 31 shows an input terminal for audio signals and numeral 41 an input terminal for video signals.

Figure 2:
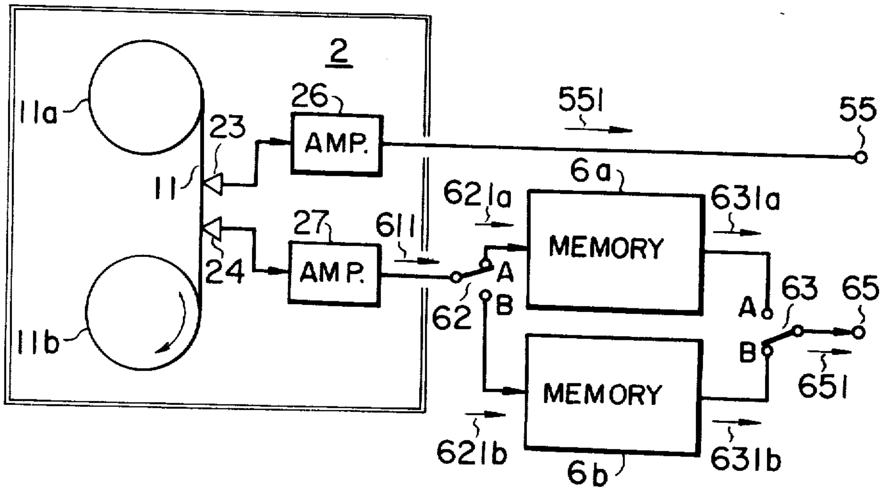
FIG. 2 is a diagram showing the fundamental construction of the tape reproducing means according to the invention.
Figure 3:
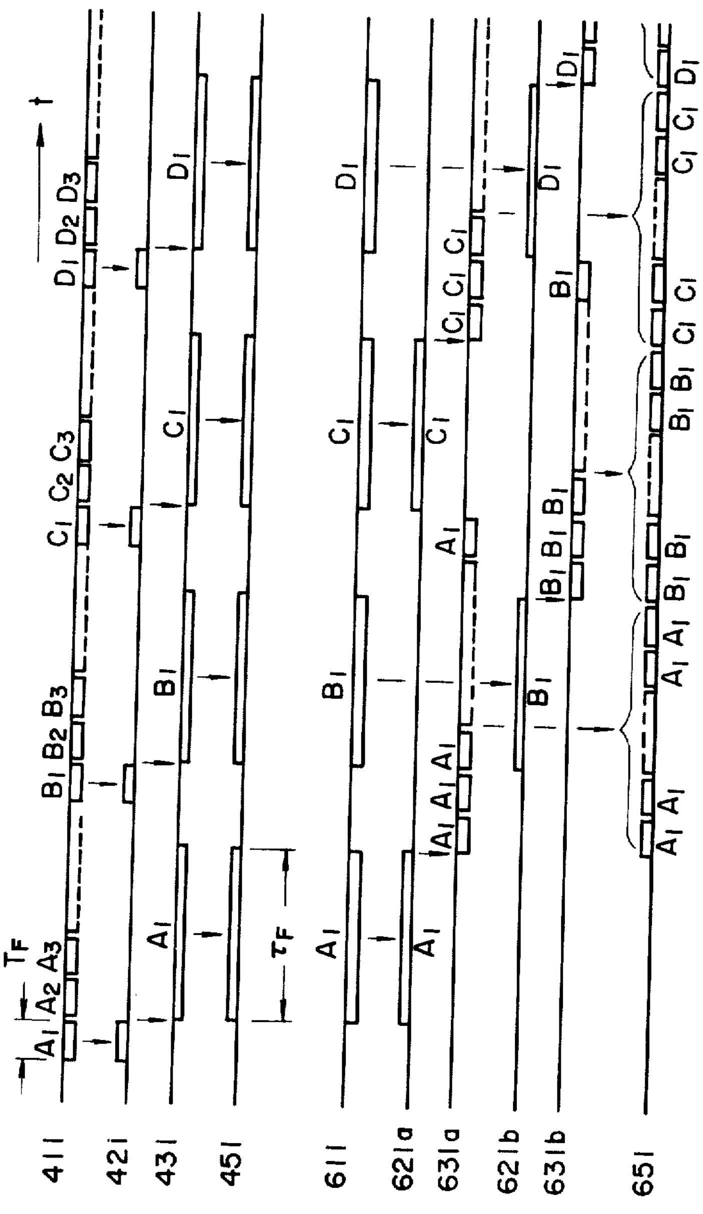
FIG. 3 shows a video information timing chart for explaining the fundamental operating principle of the tape recording and reproducing means illustrated in FIGS. 1 and 2 respectively.

In FIG. 2, reference numeral 2 shows a tape reproducer, similar to an ordinary tape reproducer, for the audio frequency band which is capable of reproducing signals in two channels, numerals 23 and 24 reproducing magnetic heads for reproducing signals from the first and second tracks respectively, numerals 26 and 27 reproducing amplifiers for amplifying signals detected by the magnetic heads 23 and 24, and numerals 6*a* and 6*b* high-speed conversion memories with the storage capacity of video signals representing one picture, in which a signal is written at the same speed as when a signal for the audio frequency band is recorded, while the recorded signal is endlessly read out repeatedly at the ordinary reading speed for a video signal, for example, 1/30 second for a frame of television signals. Reference numerals 62 and 63 change-over switches, numeral 55 an audio signal output terminal, and numeral 65 a video signal output terminal. The principle on which the video recording and reproducing operations are performed will be explained below with reference to the video signal timing chart of FIG. 3.

First, upon the application to the video input terminal 41 of FIG. 1 of a picture $A_1$ represented by the input video signal 411 which is desired to be recorded, the memory input change-over switch 42 is closed onto the side A for such a period as corresponding to picture $A_1$, whereby the video signal 411 is written in the low-speed conversion memory 4, the video signal 411 being assumed to include, as shown, a chronological series of video signals $A_1$, $A_2$, $A_3$, . . . . $B_1$, $B_2$, . . . . $C_1$, . . . . $D_1$, . . . . Upon completion of the writing of the signal into the low-speed conversion memory 4, the memory input change-over switch 42 is returned to the side B, while at the same time the memory output change-over switch 43 is connected to side A, so that the video signal of picture $A_1$ is read out at low speed to obtain a video signal 451 in the audio frequency band, which signal is recorded on the second track of magnetic tape 11 by the magnetic head 14 through the recording amplifier 17. Upon completion of the reading of the video signal out of the low-speed conversion memory 4, the memory output change-over switch 43 is returned to side B. The pictures $B_1$, $C_1$, $D_1$ and others which arrive subsequently are also recorded, as desired, in a similar manner in the magnetic tape 11 by converting them into video signals in the audio frequency band.

The low-speed conversion memory 4 performs its speed-changing operation in the ratio of one picture period $T_F$ of an input video signal to one picture period $\tau_F$ of a video signal capable of being recorded, that is, the reciprocal of the ratio between the information frequency bands thereof. Assuming that the input video signal is a television video signal for the NTSC system with the frequency band of 4.5 MHz and the latter a video signal of 10 KHz, $T_F/\tau_F = 1/450$, so that the period for which the video signal corresponding to one frame is recorded in the magnetic tape 11 is 15 seconds, thus enabling a frame of video information to be recorded for every 15 seconds.

The magnetic tape 11 containing such a video signal is processed through the tape reproducer 2 thereby to obtain video signals in the audio frequency band representing the pictures $A_1$, $B_1$, $C_1$, and $D_1$ and the like.

Referring to FIG. 2 showing the tape reproducer, it is assumed that the memory input change-over switch 62 is closed first to the side A while the memory output change-over switch 63 interlocked with the switch 62 is connected to side B. Then the video signal representing picture $A_1$ is written in the high-speed conversion memory 6*a*. On completion of the writing of the signal corresponding to one picture, the memory input change-over switch 62 is closed to side B, while the memory output change-over switch 63 interlocked therewith is turned to the side A. Under this condition, the signal is read at a predetermined speed while operating the high-speed conversion memory 6*a* endlessly, whereby a still picture signal 651 representing the picture $A_1$ of a frequency is obtained in accordance with the reading speed. This is followed by the reproduction of a video signal representing the picture $B_1$ by the tape reproducer 2, which video signal is written in the high-speed conversion memory 6*b*, whereupon the memory input change-over switch 62 and the memory output change-over switch 63 are closed to the other sides respectively to obtain a still picture signal for picture $B_1$ in place of picture $A_1$ through the reading operation of the high-speed conversion memory 6*b*. In like manner, still picture signals for pictures $C_1$, $D_1$ and so on are successively produced, so that the connection of a video monitor to the video output terminal 65 enables the selected pictures $A_1$, $B_1$, $C_1$, $D_1$ and so on to be viewed.

The provision of the two high-speed conversion memories 6*a* and 6*b* is not absolutely necessary for the tape reproducing means shown in FIG. 2, but a single high-speed conversion memory suffices on condition that no video signal is produced at its output during the writing operation.

Figure 4:
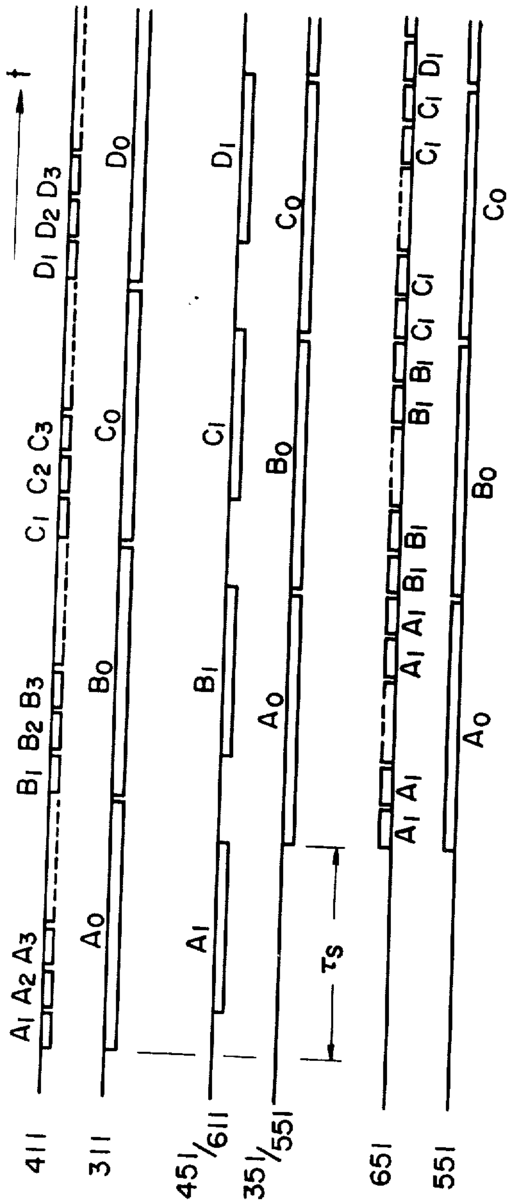
FIG. 4 is a timing chart showing the timing relation between audio information and video information for explaning the fundamental operating principle of the apparatus.

The operations for recording and reproducing audio signals will be explained with reference to the timing chart of FIG. 4 for audio and video signals. It is assumed that a video signal 411 including a chronological series of pictures $A_1$, . . . , $B_1$, . . . , $C_1$, . . . , $D_1$, . . . is applied to the video input terminal 41, while an audio signal 311 including a chronological series of corresponding sounds $A_0$, $B_0$, $C_0$ and $D_0$ is supplied to the audio input terminal 31. The audio signal 311 is recorded in the first track of the magnetic tape 11 after being delayed by time $\tau_s$, whereas the video signal 411 is recorded at the same time in the second track after the low-speed conversion as described above. In the reproduction process, a still picture signal 651 including a chronological series of pictures $A_1$, $B_1$, $C_1$ and $D_1$ is produced at the video output terminal 65, while the audio signal 551 including a chronological series of sounds $A_0$, $B_0$, $C_0$ and $D_0$ in chronological conformity with the information contained in the pictures is reproduced. Unless the audio signal delay means 3 is provided, the audio information is reproduced in advance of the video information by time $\tau_s$, giving rise to the sense of discordance to the ears of viewers. For the purpose of taking appropriate timing between the reproduced audio and video information, instead of providing the audio signal delay means, 3, the magnetic head 13 for the first track may be placed forwardly of the magnetic head 14 for the second track by the distance covered by the magnetic tape 11 during the time $\tau_s$. In like manner, the reproducing head 23 for the first track may be disposed backward of the reproducing head 24 for the second track.

Further, the purpose of taking the timing is achieved by inserting in the passage of the audio signal 551 signal delay means for delaying the signal by $\tau_s$.

Figure 5:
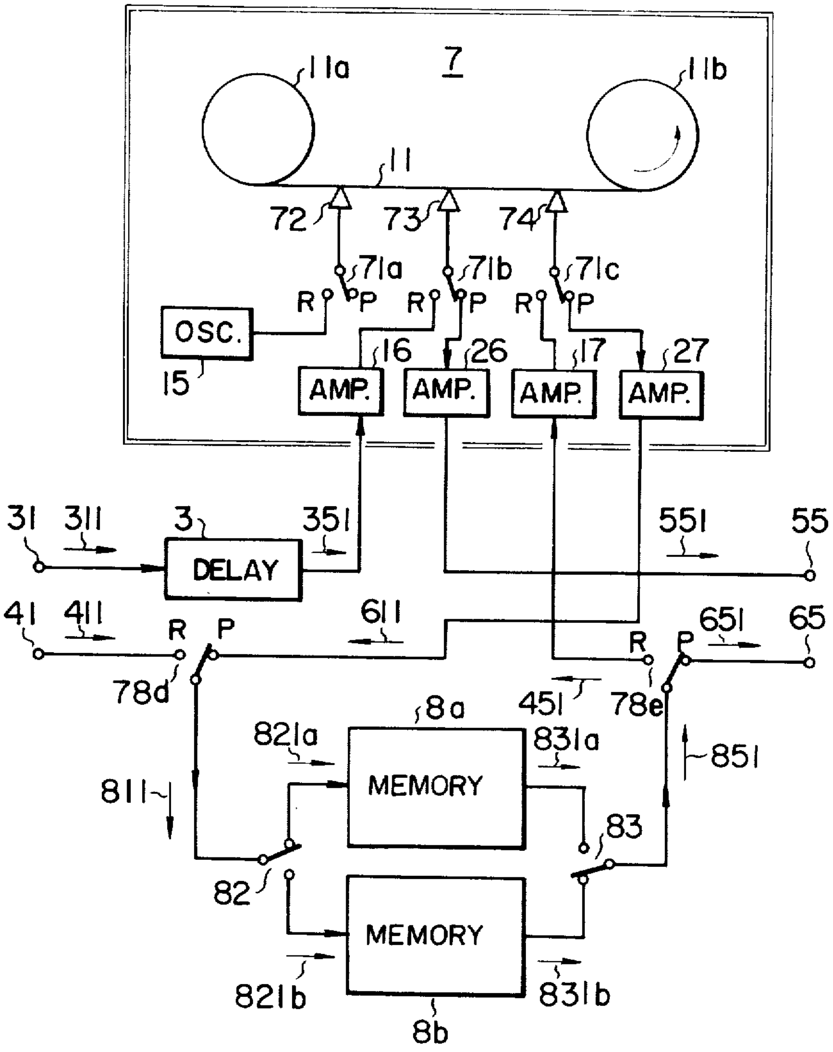
FIG. 5 is a diagram showing the fundamental construction of a video tape recording-reproducing apparatus which has both video recording and reproducing functions.

The preceding description refers to the case in which the video tape recording means and tape reproducing means are provided separately from each other. In place of such an apparatus, it is also possible to provide a video tape recording and reproducing apparatus in which both the recording and reproducing functions are integrated, as shown in FIG. 5. In the drawing, a tape recording-reproducing device 7 comprises as its main component elements a first-track recording-reproducing head 73, a second-track recording-reproducing head 74, recording-reproducing change-over switches 71*a*, 71*b* and 71*c*, a magnetic tape 11, a tape supply reel 11*a*, a tape take-up reel 11*b*, an erasing head 12, an erasing signal generator 15, a first-track recording amplifier 16, a second-track recording amplifier 17, a first-track reproducing amplifier 26 and a second-track reproducing amplifier 27. The video tape recording-reproducing apparatus according to the embodiment under consideration further comprises a pair of speed conversion memories 8*a* and 8*b* with the storage capacity of a video signal representing one picture and capable of either high-speed writing in combination with low-speed reading or low-speed writing in combination with high-speed reading and an audio signal delay means 3.

In FIG. 5, by connecting the recording-reproducing change-over switches 71*a*, 71*b* and 71*c* to side R, the recording-reproducing apparatus is made equivalent to the video tape recording apparatus of FIG. 1 in the fundamental construction, thereby making it possible to perform a video recording operation. On the other hand, if the recording-reproducing switches 71*a*, 71*b* and 71*c* are closed to side P, the apparatus is made equivalent to the tape reproducing apparatus of FIG. 2 in fundamental construction, thus making possible a reproducing operation. In such a case, the audio signal delay means 3 is not necessarily required to be incorporated in the apparatus but may be provided separately outside thereof. Further, as already mentioned, instead of providing the audio signal delay means 3, a second-track recording head (not shown) may be placed backward of the second-track recording-reproducing head 74 by the distance corresponding to delay time $\tau_s$, so that the video information is recording in advance of the audio information by time $\tau_s$ on one hand, and the timing is taken between reproduction of audio information and that of video information by the use of the second-track recording-reproducing head 74 on the other.

In the case where the audio signal consists of two or more different types of signals such as in the stereophonic system, two or more corresponding audio recording-reproducing channels may be provided. In like manner, if two or more types of video signals are to be recorded and/or reproduced simultaneously, it suffices if two or more corresponding video recording-reproducing channels are provided. It is also possible to shorten the time required for the recording of a frame of video information by the provision of two or more video recording-reproducing channels in such a manner that the video signals are divided into two different types of signals with different frequency bands or luminance and chromaticity signals which are alloted to the two channels.

It will be noted from the above description that according to the invention tape recording means of audio frequency band is used for the recording of video signals, thereby permitting an ordinary audio magnetic tape to be used as the magnetic tape 11, with the result that the apparatus according to the invention can be handled very easily.

In addition to the above explanation about the fundamental construction and operating principle of the video tape recording and tape reproducing devices according to the invention, detailed explanation will be made now of embodiments of the invention.

Among the component elements, the description of the tape recording means 1 and tape reproducing means 2, which are well known as mentioned already, will be omitted. An audio delay means 3 is easily realized by separating the recording and reproducing heads so as to provide for the length of the endless tape therebetween corresponding to a required delay time. The low-speed conversion memory 4, high-speed conversion memories 6*a* and 6*b* and the speed conversion memories 8*a* and 8*b* are operated on substantially the same principle, although the combinations of their writing and reading speeds are different. Actually, these memories include a magnetic disc, magnetic sheet, magnetic drum, endless magnetic tape and other rotary memories, so that the conversion of writing and reading speeds is achieved by changing the rotational speed of such magnetic media. Other types of memories that are usable for the purpose of the invention include a magnetic core, magnetic wire, semiconductor shift register, condenser memory or other stationary memories, in which the speed conversion is effected by changing the frequency of clock pulses. As a third type of memory, a memory of the scanning type such as a charge storage tube may be used wherein the speed conversion is achieved by changing the scanning speed. A fourth type of memory consists of a combination of any two of the above-described types, wherein one is operated at a constant speed while the speed of the other is made variable.

Figure 6:
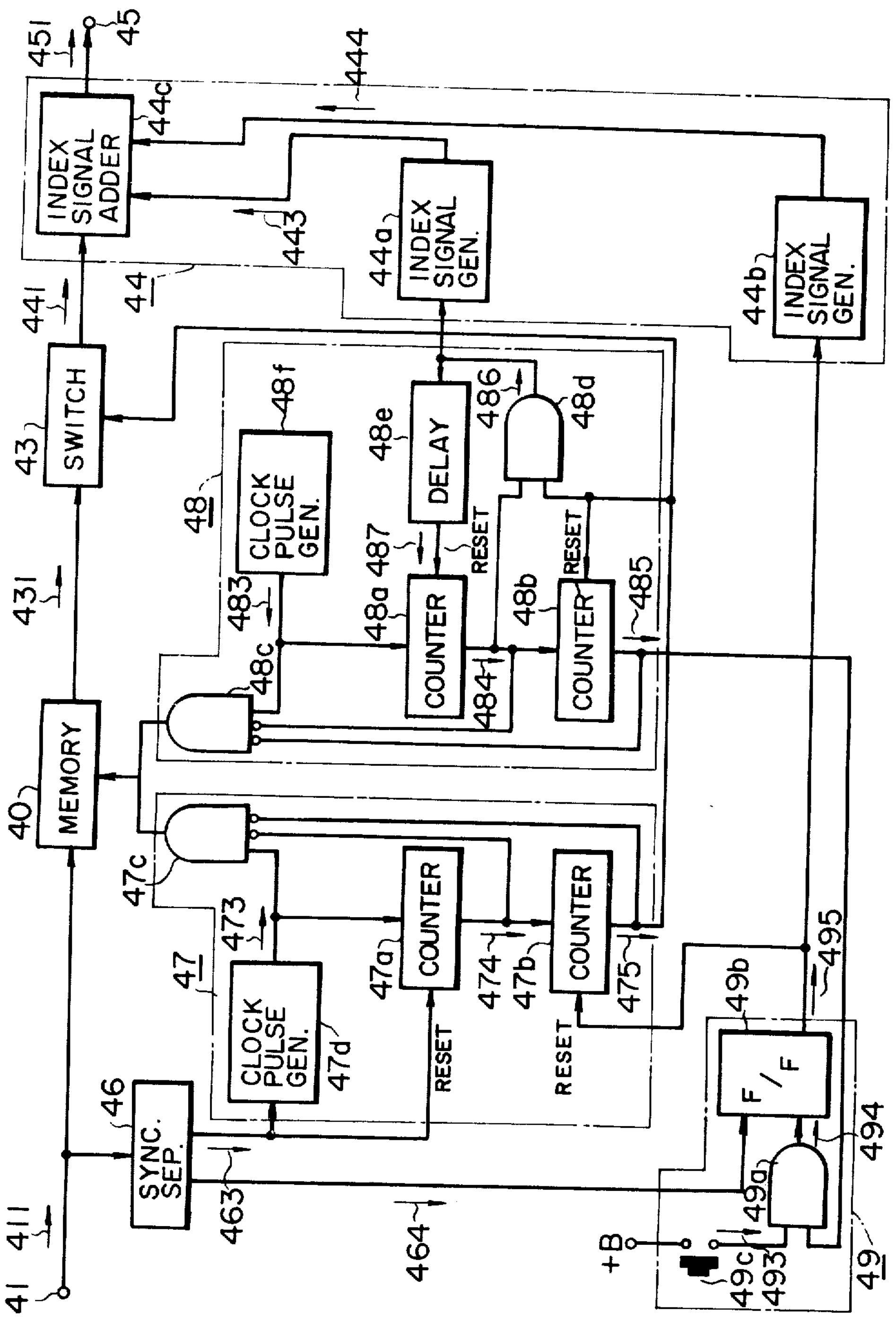
FIG. 6 is a block diagram showing a speed coversion memory for the video tape recording device embodying the present invention.
Figure 7:
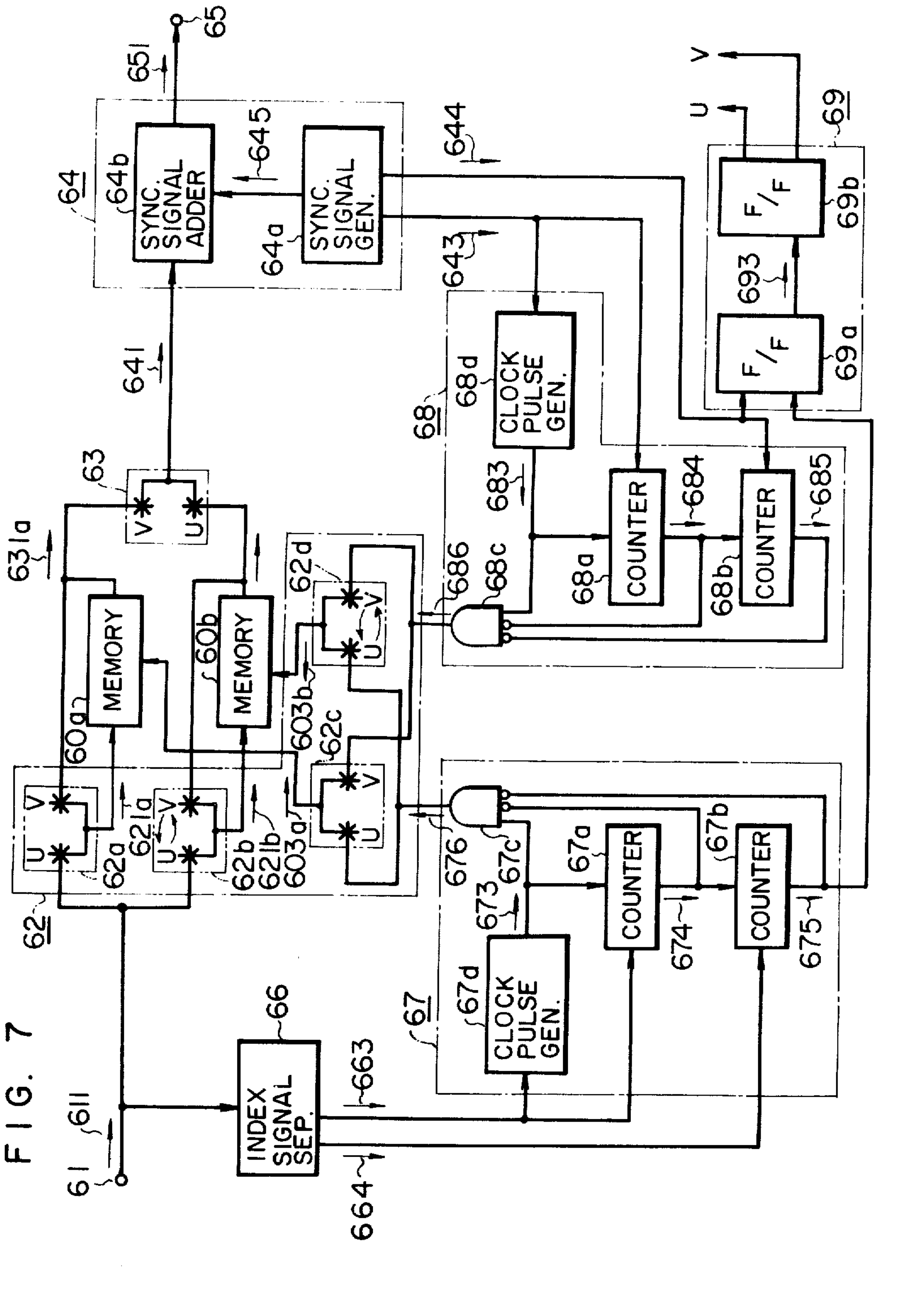
FIG. 7 is a block diagram showing another speed conversion memory for the tape reproducing means embodying the invention.
Figure 8:
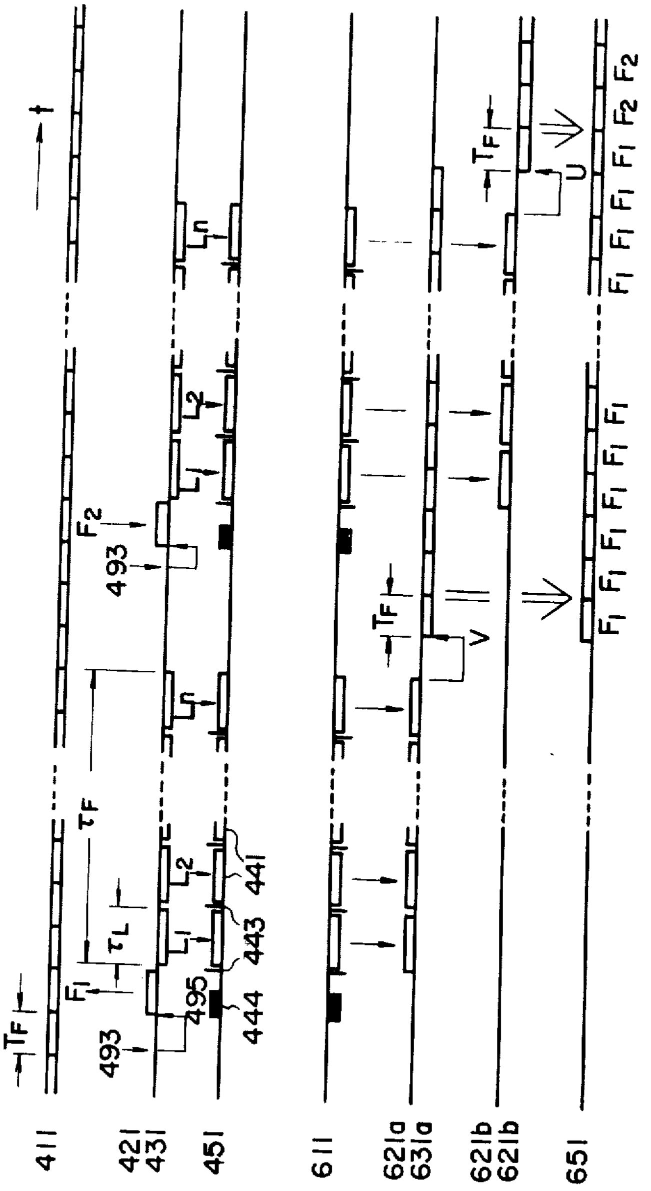
FIG. 8 shows a video information timing chart for explaining the operating principle of the embodiments shown in FIGS. 6 and 7.

A low-speed conversion memory used for the video tape recording device and a high-speed conversion memory for the tape reproducing device embodying the present invention are shown in FIGS. 6 and 7 respectively, the operating principle thereof being illustrated in FIG. 8. In these embodiments employing a stationary memory, the write and read clock pulses are synchronized with the scanning line synchronizing signal for the input and output video signals thereby to achieve synchronism in the remaining component elements. In other words, the memory under consideration is so constructed that it has a memory capacity corresponding to the number of picture elements included in a frame of video information and each picture element is allotted with a clock pulse for writing and reading operations. An actual example of such a memory is a shift register usually employed in a digital circuit, which register is used with an analog-digital converter at the input side thereof and with a digital-analog converter at the output side thereof.

The construction and operation of the low-speed conversion memory will be first explained with reference to FIGS. 6 and 8. The main component elements of this memory include a memory proper 40, a synchronizing signal separator 46, a video control signal generator section 49, a write clock pulse generator section 47, a read clock pulse generator section 48, a memory output change-over switch 43 and an index signal generator-adder means 44. The video signal 411 that has arrived at the video input terminal and that is desired to be recorded is applied to the memory proper 40 and the synchronizing signal separator 46. The video signal 411 comprises video information $L_1$, $L_2$, . . . . $L_n$ included in $n$ scanning lines constituting pictures, scanning line synchronizing signals and picture synchronizing signals. The scanning line synchronizing signals 463 and the picture synchronizing signals included in the video signal 411 are detected and separated in the synchronizing signal separator 46. The picture synchronizing signal thus separated is applied to the video control signal generator section 49 to thereby produce a video recording starting signal 495.

The video recording starting signal 495 is produced in the following way. When the video recording of a picture is desired, the video recording order switch 49*c* is depressed thereby to produce a video recording order signal 493. This order signal 493 is applied, through the AND gate 49*a*, to the flip-flop circuit 49*b* thereby to reset the same, whereupon it is reset by the picture synchronizing signal 464 thereby to generate the video recording starting signal 495.

The other input signal 485 to the AND gate 49*a* consists of a picture reading completion signal applied thereto from the reading clock pulse generator section 48, which signal is in the state "1" when the reading operation of the memory proper 40 is completed. In this state, the AND gate 49*a* allows the passage of the video recording order signal 493 therethrough. In other words, during the reading operation, the next recording order is rejected. The video recording starting signal 495 is applied both to the write clock pulse generator 47 and to the index signal generator-adder means 44. Reference numeral 47*d* shows a high-speed clock pulse generator for generating high-speed clock pulses 473 the number of which is a multiple of the number of the scanning line synchronizing signals 463, the pulse 473 being synchronized with the signal 463. The number of picture elements into which the video information included in one scanning line is to be decomposed depends on the number of clock pulses for one scanning line, and therefore the higher the resolution required, the greater the number of clock pulses required. The high-speed clock pulses 473 are applied to the inhibit gate 47*c* and the clock pulse counter 47*a*. The clock pulse counter 47*a* counts the number $p$ of clock pulses corresponding to one scanning line and produces "1" signal when such a number is reached. This output signal, indicated by numeral 474, which is produced when the writing operation for one scanning line is completed, is called a scanning line write completion signal. The inhibit gate 47*c* is closed upon application thereto the scanning line write completion signal 474 so far as it is in the state "1". Upon completion of the writing of one scanning line, the clock pulse counter 47*a* is reset by the scanning line synchronizing signal 463 applied thereto, so that the clock pulse counter 47*a* resumes its counting operation, while at the same time the output signal 474 becomes "0" to thereby open the inhibit gate 47*c*.

The scanning line write completion signal 474 is also applied to the scanning line counter 47*b* which produces a "1" signal when the number $n$ of scanning lines for one picture is reached. This output signal 475 indicates that the writing of information corresponding to one picture has been completed and is referred to as a "picture write completion signal". When the picture write completion signal 475 is in the state "1", the inhibit gate 47*c* is closed. The clock pulse counter 47*a* is reset by the scanning line synchronizing signal 463, while on the other hand the scanning line counter is not reset until the application thereto of the video recording starting signal 495 thereto from the video recording control signal generator section 49 even after completion of the counting of the number $n$ of scanning lines, thus maintaining the picture write completion signal 475 in the state "1".

As will be understood from the above description, the high-speed clock pulses 473 are passed through the inhibit gate 47*c* and applied to the memory proper 40 only during the picture scanning period for one picture following the issue of a video recording order to the video recording order switch 49C, with the result that the picture information applied to the input terminal 41 is decomposed into picture elements and written in the memory. In this case, it is necessary to maintain the memory capacity of the memory proper equal to the product of the number $p$ counted by the clock pulse counter 47*a* and the number $n$ counted by the scanning line counter 47*b*. After completion of the writing of picture information representing one picture, the inhibit gate 47*c* is not opened until the arrival of the next video recording order signal 493.

The operation in which the picture information for one picture thus stored is read at low speed is explained below.

A low-speed clock pulse generator, indicated by reference numeral 48*f*, produces low-speed clock pulses 483 the frequency of which depends on the frequency band of a signal finally recorded in the tape recording means 1. The low-speed clock pulses 483 are applied to the inhibit gate 48*c* and the read clock pulse counter 48*a*. The reading clock pulse counter 48*a*, like the clock pulse counter 47*a*, counts the number $p$ of clock pulses for one scanning line and produces a scanning line read completion signal 484 in the state "1" when that number is reached, thus closing the inhibit gate 48*c*. The scanning line read completion signal 484 is applied to the reading scanning line counter 48*b*, which, like the scanning line counter 47*b*, counts the number $n$ of scanning lines for one picture and produces a picture read completion signal 485 in the state "1" when that number is reached, resulting in the inhibit gate 48*c* being closed. The above-mentioned reading operation is performed following the writing operation. In other words, upon completion of the writing of picture information, the picture write completion signal 475 causes the scanning line counter 48b to be reset, while at the same time not only resetting the clock pulse counter 48a through the AND gate 48d and pulse delay means 48e, but closing the memory output change-over switch 43 thereby to start the reading operation. Upon completion of the reading of picture information $L_1$ for the first scanning line, the scanning line read completion signal 484 is changed to the "1" state, thereby temporarily preventing the passage of the low-speed clock pulses 483 through the inhibit gate 48c. The scanning line read completion signal 484 is passed through the AND gate 48d and the pulse delay means 48e and resets the clock pulse counter 48a again thereby to resume the reading of picture information for the next scanning line. This operation cycle is repeated until the picture read completion signal 485 is put into the state "1" upon completion of the reading of the picture information $L_1$, $L_2$, . . . $L_n$ each corresponding to one picture. The scanning starting signal 486 is applied to the index signal generator 44a to produce a scanning starting index signal 443. This signal 443, together with the picture starting index signal 444 that is an output of the picture starting index signal generator 44b triggered by the video recording starting signal 495, is applied to the index signal adder means 44c and added to the reading signal from the memory 40. The pulse delay means 48e is provided for the purpose of delaying the reading operation by the period during which the scanning start index signal 443 is produced. The low-speed picture signal 451 thus obtained is applied to the tape recording means 1 through the low-speed video output terminal 45.

Explanation will be made now of the construction and operation of the high-speed conversion memory with reference to FIGS. 7 and 8. The high-speed conversion memory comprises as its main component elements a pair of memory propers 60a and 60b, a memory input change-over switch 62, a memory output change-over switch 63, an index signal separator 66, a write clock pulse generator section 67, a read clock pulse generator 68, synchronizing signal generator-adder means 64 and a change-over switch control section 69. The low-speed picture signal 611 from the tape recording means 1 is applied to the low-speed picture input terminal 61, wherefrom it is applied to the index signal separator 66 and the memory input change-over switch 62. The index signal separator 66 separates the picture start index signal 664 and the scanning line start index signal 663 included in the low-speed picture signal 611 and applies them to the write clock pulse generator section 67. Reference numeral 67d shows a low-speed clock pulse generator for generating the low speed clock pulses in the number that is a multiple of the number of the scanning line start index signals 663 and synchronized therewith. The low-speed clock pulses 673 are applied to the inhibit gate 67c and the clock pulse counter 67a. The clock pulse counter 67a counts the number $p$ of clock pulses for one scanning line, and when that number is reached, the scanning line write completion signal 674 is put into the state "1", thereby closing the inhibit gate 67c. The scanning line write completion signals 674 are also counted by the scanning line counter 67b and cause the picture write completion signal 675 to be turned into the state "1" when that number $n$ of scanning lines for one picture is reached, thereby closing the inhibit gate 67c. The clock pulse counter 67a and the scanning line counter 67b are reset by the scanning line start index signal 663 and the picture start index signal 664 respectively, whereby the scanning line write completion signal 674 and the picture wirte completion signal 675 are put into the state "0", thereby opening the inhibit gate 67c. Thus, the low-speed clock pulses 673 are passed through the inhibit gate 67c and applied to the high-speed conversion memory proper 60a or 60b in the form of clock pulses 676 through the memory input change-over switch 62c or 62d and energize the memory 60a or 60b, as the case may be, only for the period during which each picture represented by the low-speed picture signal 611 arriving at the low-speed video input terminal 61 is scanned. As a result, the picture information applied to the input terminal 61 is decomposed into picture elements and written in the memory 60a or 60b.

Reference numeral 64a shows a synchronizing signal generator for determining the speed of a reproduced picture signal which produces a scanning line synchronizing signal 643, a picture synchronizing signal 644 and a composite synchronizing signal 645. The scanning line synchronizing signal 643 which energizes the high-speed clock pulse generator 68d contains pulses of the number in a multipled relationship with the number of the scanning line synchronizing signal 643 and generates the high-speed clock pulses 683 in synchronism with the scanning line synchronizing signals 643. The high-speed clock pulses 683 which are applied to the inhibit gate 68c are counted by the counter 68a which, upon completion of the counting of the number $p$ corresponding to one scanning line, puts the read completion signal 684 into the state "1", thereby closing the gate 68c. The read completion signal 684 is applied to the scanning line counter 68b where the pulses contained therein are counter, so that when the number $n$ of the scanning lines for one picture is reached, the picture read completion signal is put into the "1" state, thereby closing the inhibit gate 68c. The clock pulse counter 68a and the scanning line counter 68b are reset by the scanning line synchronizing signal 643 and the picture synchronizing signal 644 respectively, so that the scanning line read completion signal 684 and the picture read completion signal 685 are both put into the state "0", thereby opening the inhibit gate 68c. As a result, the high-speed clock pulses 683 are allowed to pass through the inhibit gate 68c during the scanning period for each picture which is started with the synchronization of picture reproduction and then, in the form of the read clock pulses 686, are applied to the high-speed conversion memory proper 60a or 60b to energize the same through the memory input change-over switch 62c or 62d, thus accomplishing the reading of the stored picture information. The memory input change-over switch 62 and memory output change-over switch 63 are closed on sides U and V when the memory change-over signals U and V are in the state "1", respectively. The memory change-over signals U and V which make up the two output signals of the flip-flop circuit 69b contradict each other, and it is for this reason that the memory input change-over switch 62 and memory output change-over switch 63 are provided. When the memory change-over signal U is in the "1" state, the input signal 621a applied to the memory proper 60a becomes a low-speed picture signal 611, while the input clock pulses 603a become the write clock pulses 676, so that the memory 60 the is in a writing state. On the other hand, the input signal 621*b* itself to the memory proper 60 becomes its output signal 631*b* and therefore an endless connection results, so that the input clock pulses 603*b* become high-speed read clock pulses 686, while the memory output signal 631*b* is applied through the memory output change-over switch 63 to the synchronizing signal adder 64 thereby to maintain the memory in a reading state. When the memory input change-over signal V is in the "1" state, by contrast, the high-speed conversion memory proper 60*a* is "reading", while the high-speed conversion memory proper 60*b* is "writing". In other words, one of the memories writes the input picture signal 611 at low speed, while the other memory reads the stored signal at high speed. In the process of reading, the signal read is produced externally as its output on one hand and fed back to the input thereof to be stored in the memory again, so that as far as the read clock pulses are applied to the memory, the same picture signal is produced as an output, whereby a still picture signal is obtained.

The reversion of the memory change-over signals U and V one of which is in a "1" state at a given time is effected as follows. When the picture write completion signal 675 is put into the state "1", the flip-flop circuit 69*a* is reset, whereupon the flip-flop circuit 69*a* is set by the first-arriving one of the picture synchronizing signals 644 and the change-over trigger signal 693 is generated thereby to reverse the flip-flop circuit 69*b*. This change-over operation causes one of the memories proper 60*a* and 60*b* to be connected endlessly while the low-speed picture information is being written in the other, whereby the picture information already written prior to the change-over is repeatedly read through the reproduction synchronizing signal. This operation continues from the completion of the preceding writing operation until the change-over of the operation of the memories proper 60*a* and 60*b* which is effected in synchronism with the picture reproduction. The output signal of the memory in a reading state is applied through the memory output change-over switch 63 to the synchronizing signal adder 64*b* where the composite synchronizing signal 645 is added thereto, resulting in a reproduction output picture signal 651 being produced and sent out by way of the picture output terminal 65.

To summarize, the embodiment under consideration is characterized in that desired signals are picked up from high-speed picture signals containing a multiplicity of picture series at predetermined periods required for low-speed conversion, and the signals thus picked up are converted into low-speed picture signals of audio frequency band capable in the being recorded in the tape recording means, while on the other hand low-speed picture signals containing a multiplicity of picture series in the audio frequency band capable of being reproduced by the tape reproducing means are changed into high-speed picture signals to thereby obtain a succession of selected frames of still picture signals to the satisfaction of the functional requirements of the low-speed and high-speed conversion memories included in the video tape recording device and the tape reproducing device shown in FIGS. 1, 2 and 5.

The embodiments shown in FIGS. 6 and 7 are typical ones and they may be modified easily as follows. For example, the clock pulse counter 47*a*, scanning line counter 47*b*, inhibit gate 47*c*, clock pulse counter 48*a*, scanning line counter 48*b* and inhibit gate 48*c* which are used separately for both the high-speed clock pulse generator section 47 and low-speed clock pulse generator section 48 may be replaced by the clock pulse counter 47*a* or 48*a*, scanning line counter 47*b* or 48*b*, and inhibit gate 47*c* or 48*c* common to the sections 47 and 48. Also, in the case where the low-speed picture signal contains self-clock pulses, the low-speed clock pulse generator 67*d* is not required but a self-clock pulse separator is used to obtain low-speed clock pulses 673 from the low-speed picture signal 611. Further, the low-speed conversion memory and the high-speed conversion memory may be combined into a speed conversion memory for the video tape recording-reproducing apparatus, thus leading to the economical advantage that common elements may be used for both the low-speed and high-speed conversion memories.

It will be apparent from the above description that the present invention provides a video tape recording device and a tape reproducing device with an ordinary audio magnetic tape which is capable of recording or reproducig audio information and selected still picture information simultaneously. These devices according to the invention have the advantages that low-cost and compact audio magnetic tape can be used, that both audio and video information can be recorded in a single medium, and that the invented devices can be used with the conventional tape feed system of the multi-channel audio tape recording-reproducing apparatus. Thus, the present invention, with its high operating efficiency and economical value, is applicable to the wide field of transmission of selected still picture information together with audio information.

What we claim is:

1. An apparatus for processing both video and audio signals comprising:

first means, which receives a plurality of successive video signals corresponding to a respective plurality of successive still pictures, for selectively storing, at standard video frequencies, a respective selected one of said video signals and for reading out the stored signal at a speed of the audio frequency band;

second means for receiving a plurality of successive audio signals; and third means, coupled to said first and second means, for recording both said audio signals and stored video signals on respective recording channels in the same recording means at a speed corresponding to that for the audio frequency band, and wherein said third means includes delay means, coupled to said second means, for delaying the recording of a respective one of said audio signals for a period of time corresponding to the length of a video signal received by said first means and the length of the corresponding video signal recorded in said recording means.

2. An apparatus according to claim 1, further including fourth means, coupled to said third means, for reproducing successive audio signals recorded in said recording means at audio frequencies while reproducing continuously and repeatedly respective successive ones of the recorded video signals at video frequencies, during the successive intervals of time in which said audio signals are reproduced.

3. An apparatus according to claim 1, further comprising fourth means, coupled to said third means, for selectively storing alternate ones of the video signals recorded in said recording means in separate memory means during respectively alternate successie intervals of time; and fifth means, coupled to said third means and said fourth means, for reproducing the audio signals stored on said recording means at audio frequecies and reproducing one of the video signals selectively stored in one of the separate memory means of said fourth means at sandard video frequencies while storing a succeeding video signal in the other separate memory means of said fourth means.

4. An apparatus according to claim 3, wherein said fifth means includes means for reproducing a respective selectively stored video signal continuously and repeatedly during a respective successive interval of time.

5. An apparatus according to claim 4, wherein each of said intervals of time corresponds to the length of a respective audio signal.

6. A device for recording video and audio signals of still pictures onto a magnetic audio tape comprising:

memory means having a capacity for storing a video signal representing one picture, writing and reading operations into and out from said memory means being controlled by clock pulses;

means for generating high speed clock pulses which are identical with clock pulses required for sampling ordinary video signals;

means for generating low speed clock pulses of the audio frequency band;

magnetic tape recording means having at least two channels of the audio frequency band;

means for selecting a video signal representing one picture from video signals supplied from an external source and applying the selected video signal and the high speed clock pulses to said memory means so that the video signal representing one picture is written into said memory means;

means for reading out the video signal stored in said memory means at a speed of the audio frequency band in response to application of the low speed clock pulses to said memory means upon completion of the writing operation into said memory means;

means for recording the read out signal onto at least one of said channels of said magnetic tape recording means; and means for recording audio signals onto at least the other of said channels of said magnetic tape recording means, said audio signals recording means including audio signal delay means for receiving the audio signals to be recorded and for delaying the recording of a respective one of said audio signals for a period of time corresponding to the length of a video signal received by said video signal selecting means and the length of the corresponding video signal recorded in said memory means.

7. A recording device according to claim 6, wherein said audio signal delay means comprises an endless magnetic tape;

means for driving said endless magnetic tape to run at a constant speed;

a recording head for recording audio signals onto said endless magnetic tape; and a reproducing head for reproducing the signals recorded on said endless magnetic tape, said reproducing head being mounted separately from said recording head with a space along the travelling path of said endless magnetic tape so that the signals recorded on said endless magnetic tape are reproduced after a delay of the duration substantially equal to the duration necessary to record the video signal representing one picture stored in said memory means on said magnetic tape recording means.

8. A device for reproducing video and audio signals of still pictures converted into an audio frequency band and recorded onto a magnetic audio tape, comprising magnetic tape reproducing means having at least two channels of the audio frequency band;

memory means having a capacity for storing a video signal representing one picture, writing and reading operations into and out from said memory means being controlled by clock pulses;

means for generating low speed clock pulses of the audio frequency band;

means for generating high speed clock pulses which are identical with clock pulses required for sampling ordinary video signals;

means for writing video signals of the audio frequency band, read out from at least one of said channels of said magnetic tape reproducing means, into said memory means utilizing the low speed clock pulses;

means for supplying the high speed clock pulses to said memory means upon completion of the writing operation into said memory means, so as to repeatedly read out the video signal stored in said memory means to thereby obtain a video signal of still picture; and means for reproducing audio signals from at least the other of said channels of said magnetic tape reproducing means, said audio signals having been recorded on at least the other of said channels of said magnetic tape through audio signal delay means which effects a delay of the recording of a respective one of said audio signals for a period of time corresponding to the length of an ordinary video signal and the length of the corresponding video signal stored in said memory means, so that said audio signals are reproduced in synchronism with said repeatedly read out video signal.

9. A device utilizing a magnetic audio tape and for recording and reproducing video and audio signals of still pictures comprising magnetic tape recording and reproducing means having two channels of the audio frequency band;

memory means having a capacity for storing a video signal representing one picture, writing and reading operations into and out from said memory means being controlled by clock pulses;

means for generating low speed clock pulses of the audio frequency band;

means for selecting a video signal representing one picture from video signals supplied by an external source;

means for writing the video signal selected by said selecting means into said memory means utilizing the high speed clock pulses at the same speed as the speed at which the video signals are supplied by said external source;

means for reading-out the stored video signal, upon the completion of writing the video signal representing one picture into said memory means, from said memory means at a low speed utilizing the low speed clock pulses so as to convert the read-out signal into a video signal of the audio frequency band;

means for recording the video signal of the audio frequency band read out at the low speed onto one of said channels of said magnetic tape recording and reproducing means;

means for recording audio signals onto the other one of said channels of said magnetic tape recording and reproducing means;

means for reproducing the video signal of the audio frequency band from said magnetic tape recording and reproducing means;

means for writing the reproduced video signal of the audio frequency band into said memory means at a low speed according to the speed at which the video signal of audio frequency band is reproduced utilizing the low speed clock pulses;

means for repeatedly reading out the video signal stored in said memory means, upon the completion of writing the video signal into said memory at the low speed, at a high speed utilizing the high speed clock pulses so as to obtain a video signal of still picture; and means for reproducing the audio signals from the other one of said channels of said magnetic tape recording and reproducing means at the same time when the videl signal of still picture is obtained.

10. A device for reproducing video and audio signals of still pictures converted into a signal of the audio frequency band and recorded onto a magnetic audio tape comprising:

magnetic tape reproducing means for reproducing a signal of the audio frequency band having at least two channels;

first memory means having a capacity for storing a video signal representing one picture, writing and reading operations into and out from said memory means being controlled by clock pulses;

second memory means identical with said first memory means;

means for generating low speed clock pulses of the audio frequency band;

means for generating high speed clock pulses which are identical with clock pulses required for sampling ordinary video signals;

means for writing the video signal of the audio frequency band reproduced from at least one of said channels of said magnetic tape reproducing means at a speed of the audio frequency band utilizing the low speed clock pulses into said first memory means;

means for repeatedly reading out the video signal written in said first memory means, upon completion of the writing operation into said first memory means, from said first memory means at a speed of video frequency band to thereby obtain a video signal of still picture;

means for writing the next video signal of audio frequency band reproduced from said one of said channels of said magnetic tape reproducing means into said second memory means at the speed of the audio frequency band utilizing the low speed clock pulses;

means for permitting repetition of reading out the written signal from said first memory means in the time during which said second memory means is being written-in;

means for repeatedly reading out the video signal written in said second means, upon completion of the writing operation into said second memory means, form said second memory means at a speed of the video frequency band utilizing the high speed clock pulses, so as to obtain a video signal of a still picture; and means for reproducing audio signals from at least the other of said channels of said magnetic tape reproducing means.

* * * * *